(12) United States Patent
Fujita

(10) Patent No.: US 6,912,064 B1
(45) Date of Patent: Jun. 28, 2005

(54) IMAGE FORMING APPARATUS AND IMAGE FORMING METHOD USING THE SAME

(75) Inventor: Toru Fujita, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 09/369,424

(22) Filed: Aug. 6, 1999

(30) Foreign Application Priority Data

Aug. 7, 1998 (JP) .......................................... 10-224117

(51) Int. Cl.⁷ .............................................. H04N 1/40
(52) U.S. Cl. ..................................... 358/1.9; 358/519
(58) Field of Search ............... 358/1.9, 519, 3.06–3.12, 358/3.21–3.22

(56) References Cited

U.S. PATENT DOCUMENTS

| | | | |
|---|---|---|---|
| 4,347,523 A | | 8/1982 | Ohara ......................... 346/108 |
| 4,858,023 A | * | 8/1989 | Tada ........................... 358/471 |
| 5,325,153 A | * | 6/1994 | Mitsuse et al. ............... 399/74 |
| 5,374,996 A | * | 12/1994 | Eguchi et al. .............. 358/3.23 |
| 5,469,267 A | * | 11/1995 | Wang ......................... 358/3.21 |
| 5,550,647 A | * | 8/1996 | Koike ........................ 358/3.03 |
| 5,732,151 A | * | 3/1998 | Moon et al. ................. 382/167 |
| 5,838,465 A | * | 11/1998 | Satou et al. ................. 358/520 |
| 5,854,882 A | * | 12/1998 | Wang .......................... 358/1.9 |
| 6,014,462 A | * | 1/2000 | Yamakawa .................. 382/200 |
| 6,055,071 A | * | 4/2000 | Kuwata et al. ............. 358/501 |

FOREIGN PATENT DOCUMENTS

| | | | | |
|---|---|---|---|---|
| EP | A2 0 794 656 | 9/1997 | .......... | H04N/1/407 |
| EP | A2 0 840 497 | 5/1998 | .......... | H04N/1/407 |
| JP | 3-271764 A | 12/1991 | | |
| JP | 4-213470 A | 8/1992 | | |
| JP | 7-264412 | 6/1995 | | |
| JP | 8-69210 | 3/1996 | .......... | G03G/21/00 |
| JP | 10-32713 A | 2/1998 | | |

* cited by examiner

*Primary Examiner*—Thomas D. Lee
*Assistant Examiner*—Stephen Brinich
(74) *Attorney, Agent, or Firm*—Sughrue Mion, PLLC

(57) ABSTRACT

In order to accurately correct environmental variation and aged variation of gamma characteristics, RGB tone data are color-converted to be formed as CMYK tone data, then a tone correction for improving gamma characteristics is performed on the CMYK tone data. The CMYK tone data after the tone correction are subjected to half-toning to be converted into half-tone data. On the basis of the half-tone data, an image is printed by an electrophotography process. A test image is printed at a predetermined timing. A sensor reads the test image. On the basis of a signal of the sensor, a correction table for the tone correction is calculated by correction table calculation. In the tone correction, 8-bit input tone data are converted into 10-bit corrected tone data. Since the tone correction is performed on CMYK data in place of RGB data and the bit number of tone data is extended from 8 bits to 10 bits by the tone correction, the accuracy of improvement of gamma characteristics is enhanced.

43 Claims, 6 Drawing Sheets

IMAGE FORMING APPARATUS AND IMAGE FORMING METHOD USING THE SAME

BACKGROUND OF THE INVENTION

The present invention relates to an image forming apparatus which may be applied to a printer, a copier, a facsimile receiving apparatus, or the like, and more particularly to a technique of correcting gamma characteristics of an image forming apparatus.

The characteristics of an image forming apparatus vary in accordance with the environment including temperature, humidity and aged variation. Particularly, environmental variation and aged variation of gamma characteristics of an electrophotography process (i.e., relationships between a density value indicated by input image information and the corresponding density value of an output image) become problematic.

In order to solve the problem, Japanese Patent Publication No. 8-69210A discloses an image reproducing apparatus in which sample images that are called patch images and have different densities are printed as tests, and the densities of the RGB colors of each of the patch images that are formed on a sheet or a photosensitive member are measured optically or electrically. On the basis of results of the measurements, an appropriate one is selected from several kinds of gamma curves which are previously stored in a ROM for each of the RGB colors. The selected RGB gamma curves are used in gamma correction for the density level (tone level) of each of the RGB colors, in an image process preceding to an electrophotography process.

The related apparatus uses gamma curves which are selected from the several previously prepared gamma curves, and hence gamma characteristics of the image forming apparatus can be made close to ideal characteristics. However, it is impossible to accurately match gamma characteristics with the ideal ones because characteristics of an actual electrophotography process do not change in a manner strictly coincident with the previously prepared gamma curves. Furthermore, plural gamma curves must be previously programmed in the ROM. Therefore, the ROM is required to have a large capacity, so that the production cost of the apparatus is increased.

In the related apparatus, gamma correction is applied on the input RGB tone levels. Usually, final printing on a sheet is performed by using coloring agents (typically, toners) of CMYK. Therefore, the RGB tone levels which have undergone gamma correction must be converted into the CMYK tone levels by performing color conversion. When color conversion is performed, however, there arises a problem in that the accuracy of the gamma correction is lowered.

SUMMARY OF THE INVENTION

Consequently, it is an object of the present invention to accurately correct environmental variation and aged variation of gamma characteristics of an image forming apparatus.

It is another object of the present invention to provide to reduce a memory capacity required for correcting environmental variation and aged variation of gamma characteristics of an image forming apparatus.

According to one aspect of the present invention, tone correction for improving gamma characteristics of an image forming process is applied on an input tone level in a color system of a coloring agent that is used in image formation, to produce a corrected output tone level. By using the corrected output tone level, half-toning is performed to output a half-tone data. On the basis of the half-tone data, an image is formed by using the coloring agent.

According to this configuration, tone correction for improving gamma characteristics is performed on the tone level of the coloring agent color system (typically, the CMY or CMYK color system) after color conversion. As compared with the related art in which the tone level of a color system such as RGB before color conversion is corrected, therefore, no influence due to color conversion is exerted and hence gamma characteristics can be improved more accurately.

In a preferred embodiment, a tone correction section extends an input tone level to an output tone level the value resolution (the number of bits assigned to one color of one pixel) of which is higher than that of the input tone level. When the value resolution of the input tone level has 8 bits (256 levels), for example, the input tone level is converted into an output tone level in which the value resolution is extended to 10 bits (1024 levels). According to this configuration, the accuracy of improvement of gamma characteristics is enhanced.

In a preferred embodiment, a usual print mode in which an image to be seen by a human being is formed, and a test print mode in which a test image for measurement of the gamma characteristics is formed are used. In the test print mode, the optical density of the formed test image is measured, and tone correction information which is to be used by the tone correction section is produced from a measurement value by calculation. Since correction information is produced by calculation, the embodiment can improve gamma characteristics more accurately than the related art method in which an appropriate one is selected from plural sets of previously prepared correction information. Furthermore, it is not required to previously prepare plural sets of correction information in a ROM or the like. Therefore, a ROM of a small capacity can be used.

In a preferred embodiment, the value resolution produced by half-toning in the test print mode is higher than that in the usual print mode. According to this configuration, screen lines of a screen for the test print mode can be made larger in number than those for the usual print mode (namely, the pitches of half-tone dots can be reduced), so that the test image can be enhanced in sensitivity of the optical density with respect to the tone level. As a result, highly accurate correction information can be produced and hence the accuracy of improvement of gamma characteristics is enhanced.

In reflection of the above, in a preferred embodiment, different screens are used in half-toning of the test print mode and that of the usual print mode, and screen lines of the screen for the test print mode are larger in number than those for the usual print mode. Moreover, the shape of half-tone dot on the screens is different in the test print mode and the usual print mode. In the test print mode, for example, used is a special screen having a high performance of measuring the optical density, such as a stripe screen in which fine lines are arranged in the subscanning direction.

At least a part of the steps of the image forming method of the present invention can be implemented by a computer. Computer programs for such steps may be installed or loaded on a computer via various kinds of media such as a disk-type storage device, a semiconductor memory, and a communication network.

In a preferred embodiment, the whole of the image forming method of the present invention is implemented in a single image forming apparatus (e.g., one printer). The invention is not restricted thereto. In a system comprising a host computer and a printer, for example, a part (e.g., the tone correction) of the steps of the image forming method of the present invention may be implemented by the host computer.

DETAILED DESCRIPTION OF THE PREFERRED EMBODIMENTS

Figure 1:
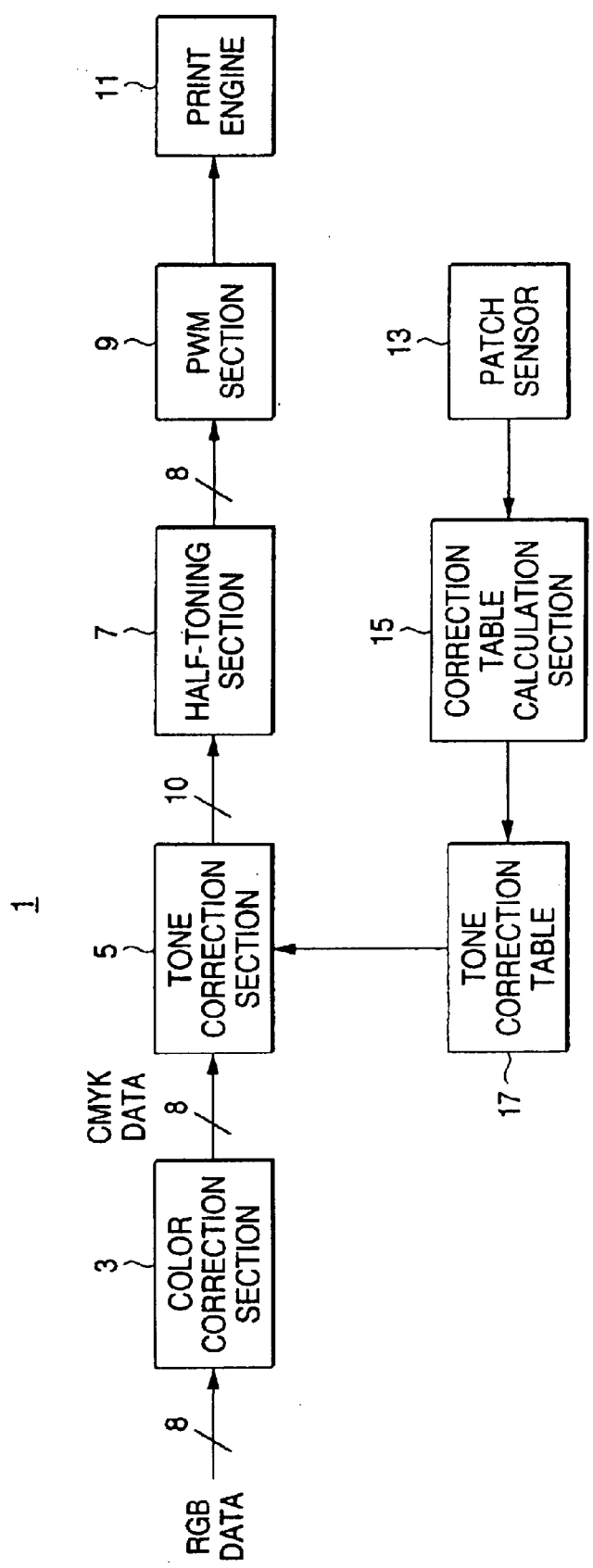
FIG. 1 is a block diagram showing the configuration of an embodiment of the present invention.

FIG. 1 shows the functional configuration of main portions of a color image forming apparatus which is an embodiment of the present invention.

The color image forming apparatus 1 comprises a color conversion section 3, a tone correction section 5 which is subsequent to the color conversion section, a half-toning section 7 which is subsequent to the tone correction section, a PWM (pulse width modulation) section 9 which is subsequent to the half-toning section, and a print engine 11 which is subsequent to the PWM section. The color image forming apparatus 1 further comprises a patch sensor 13, a correction table calculation section 15, and a tone correction table 17 stored in a nonvolatile memory.

The print engine 11 prints an image on a sheet by means of an electrophotography process using toners of four colors or CMYK. The gamma characteristics of the print engine 11 are changed in accordance with variation of the environment including the temperature and the humidity, and also with age. Therefore, the gamma characteristics of the whole of the image forming apparatus 1 must be always kept to be coincident with ideal ones irrespective of a change of the gamma characteristics of the print engine 11. To comply with this, the patch sensor 13, the correction table calculation section 15, the tone correction table 17, and the tone correction section 5 are disposed. Hereinafter, the configuration of the embodiment will be described in more detail.

In the same manner of a color conversion section of a color image forming apparatus of the related art, the color conversion section 3 converts RGB data indicative of tone levels of the RGB components of each pixel of an image, into CMYK data indicating tone levels of corresponding CMYK components. In the color conversion section 3, for example, input RGB data have 8 bits (i.e., indicating 256 levels) per one color of one pixel, and also output CMYK data similarly have 8 bits (i.e., indicating 256 levels) per one color of one pixel. The CMYK data output from the color conversion section 3 are supplied to the tone correction section 5.

The tone correction section 5 performs tone correction on the CMYK data of each pixel and supplied from the color conversion section 3. Specifically, the tone correction section 5 refers the tone correction table 17 which is previously registered in a nonvolatile memory, and, in accordance with the tone correction table 17, converts the input CMYK data of each pixel and supplied from the color conversion section 3, into corrected CMYK data indicative of corrected tone levels. As described above, this tone correction is performed with the objective of compensating a change of the gamma characteristics of the print engine 11 to always keep the gamma characteristics of the whole of the image forming apparatus 1 to ideal ones.

Figure 2:
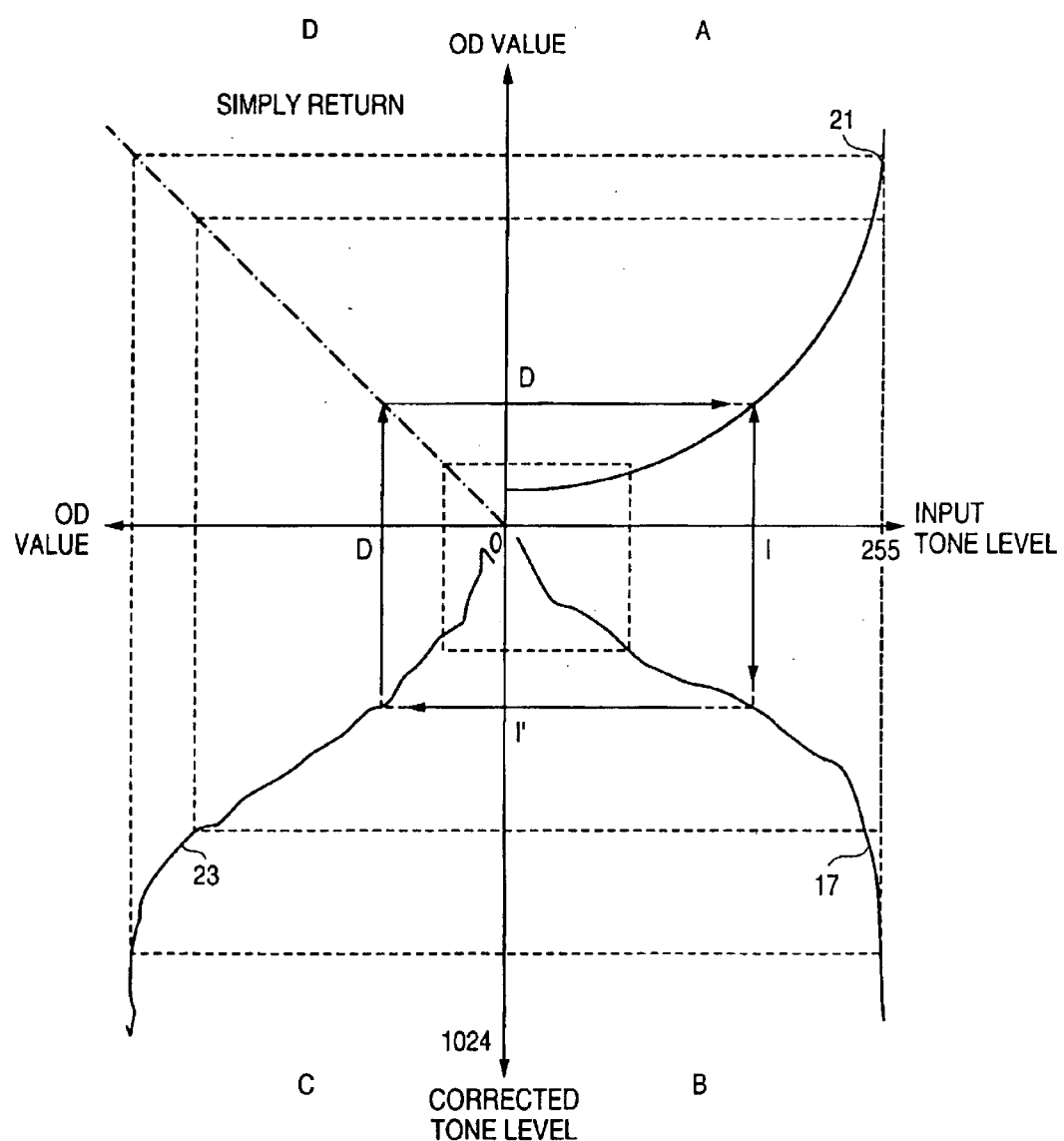
FIG. 2 is a diagram showing the principle of tone correction.

FIG. 2 shows the principle of the tone correction. In quadrant A of FIG. 2, ideal gamma characteristics 21 are shown as an example. The abscissa of quadrant A shows the input tone level indicated by the input CMYK data, and the ordinate shows the value of the optical density (OD value) of an image printed on a sheet. In quadrant C in a diagonal position with respect to quadrant A, the gamma characteristics 23 (hereinafter, referred to as screen gamma characteristics) which the print engine 11 (strictly speaking, including also the tone correction section 5 and the PWM section 9 shown in FIG. 1) actually has are exemplarily shown. The abscissa of quadrant C shows the OD value of an image to be printed on a sheet, and the ordinate shows the corrected tone level indicated by the CMYK data after the tone correction. In quadrant B which exists between quadrants A and C, the tone correction table 17 for converting the input tone level of the abscissa into the corrected tone level of the ordinate is exemplarily shown.

The tone correction performed by the tone correction section 5 corresponds to conversion in which the input tone level l of each pixel is converted into the corrected tone level l' of the pixel in quadrant B of FIG. 2 by using the tone correction table 17. The corrected tone level l' of each pixel after the tone conversion is processed by the half-toning section 7 shown in FIG. 1. A result of the process is supplied to the electrophotography process of the print engine 11 through the PWM section 9, with the result that an image is printed onto a sheet. The process from the half-toning to the printing corresponds to conversion in which the corrected tone level l' of each pixel is converted into the OD value D of the printed image in accordance with the screen gamma characteristics 23. In the series of processes, when the tone correction table 17 is appropriately set with respect to the screen gamma characteristics 23 as in the example of FIG. 2, the relationships between the input tone level l and the OD value D of the printed image (i.e., the gamma characteristics of the whole of the image forming apparatus 1) coincide with the ideal gamma characteristics 21 shown in quadrant A.

In the tone correction described above, as shown in FIGS. 1 and 2, the input CMYK data have, for example, 8 bits (256 levels) per one color component of one pixel. When the data are gray-scale converted, the corrected CMYK data after the conversion have, for example, 10 bits (1024 levels) per one color component of one pixel. As seen from the description below, the increased number of tone levels (value resolution) of image data after the tone conversion as compared with those of the input image data contributes to production of the tone correction table 17 of an excellent accuracy so as to attain ideal gamma characteristics at a high accuracy.

Referring again to FIG. 1, the configuration of the rear stage of the tone correction section 5 will be described.

Figure 3A:
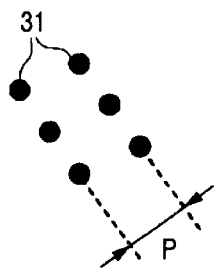
FIGS. 3A to 3C are diagrams showing an example of a pattern of growing half-tone dots.
Figure 3B:
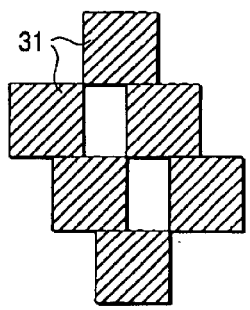
Figure 3C:
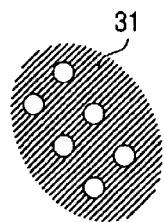

The half-toning section 7 receives the corrected CMYK data which have undergone the tone correction and which have 10 bits (1024 levels) per one color of one pixel, and converts the 10-bit data into 8-bit data while causing the eyes of a human being to sense as if the 1024 tone levels are maintained. As techniques for the half-toning, various techniques such as the error diffusion method, the dither method, and the screen method are known. In an electrophotography process, the screen method is preferably used in which a half-tone dot (a dot or a cluster of plural dots) is grown in a predetermined pattern as the density is made higher. FIG. 3 briefly shows the manner of growing half-tone dots 31 by the screen method in accordance with increase of the density. FIGS. 3A, 3B and 3C exemplarily show the half-tone dots 31 in the case of a low density, an intermediate density and a high density, respectively.

The half-tone CMYK data which are output from the half-toning section 7 and which have 8 bits per one color of one pixel indicate in 256 levels the dot sizes of the toners of each of the CMYK colors which are to be attached to pixels so as to form a half-tone dot. In half-toning of an image forming apparatus of the related art, usually, the bit number of data is reduced to about 2 bits (the dot size: 4 levels) per one color of one pixel. By contrast, in half-toning of the embodiment, 8-bit data which express the dot size in 256 levels are used. This is performed in order to increase the number of screen lines (the reciprocal of the pitch P of the half-tone dots 31 shown in FIG. 3, i.e., the degree of the fineness of the half-tone dots). When the dot size of one pixel is expressed in 4 levels in the same manner as the related art, a region of a matrix of 16×16 pixels is required in order to express 1024 tone levels indicated by 10-bit data from the tone correction section 5. The dimension of the matrix substantially corresponds to the pitch P (see FIG. 3) of the half-tone dots. When the print engine 11 has the resolution of 600 [dpi] (dot per inch), therefore, the screen frequency is 600÷16=37.5 [lpi](line per inch). Namely, the half-tone dots are considerably rough. By contrast, in the embodiment, the dot size is expressed in 256 levels. Consequently, a region of a matrix of 2×2 pixels is sufficient for expressing 1024 tone levels indicated by the CMYK data from the tone correction section 5. In the case of the resolution of 600 [dpi], therefore, the screen frequency is 600÷2=300 [lpi], and, in the case of 300 [dpi], the screen frequency is 300÷2=150 [lpi]. Namely, the half-tone dots are very fine. Usually, the screen frequency of about 150 [lpi] is sufficient for the eyes of a human being. In usual printing (printing of an image which is to be seen by a human being), therefore, half-toning may be performed at the screen frequency of at least about 150 [lpi]. The half-toning section 7 of the embodiment can realize a higher screen frequency or 150 to 300 [lpi]. In this way, half-toning is performed at the screen frequency which is higher than that required in usual printing, in consideration of printing of a patch image that will be described later in detail. A patch image is printed in order to measure the screen gamma characteristics 23 shown in quadrant C of FIG. 2. As the screen frequency in printing of a patch image is higher, the sensitivity of the OD value of the printed patch image with respect to a change of the input tone level is higher (namely, the OD value changes more sensibly). When a patch image is printed at the screen frequency which is higher than that required in usual printing, therefore, the screen gamma characteristics 23 can be correspondingly measured more accurately, so that the tone correction table 17 of high accuracy can be prepared. As a result, gamma characteristics of usual printing can be accurately corrected to ideal ones.

The half-toning section 7 may always perform half-toning at such a high screen frequency, in both printing of a patch image and usual printing. In the embodiment, however, half-toning is not performed in this way. Namely, only when a patch image is to be printed, half-toning is performed at such a high screen frequency, and, in usual printing, half-toning is performed at a lower screen frequency which is required in the usual printing, i.e., a screen frequency of about 150 [lpi]. It is assumed that the screen frequency in usual printing is 150 [lpi]. When the engine 11 has a resolution of, for example, 600 [dpi], tones of a required number can be expressed by a matrix of 4×4 pixels, and, when the resolution is 300 [dpi], tones of a required number can be expressed by a matrix of 2×2 pixels. In printing of a patch image, in order to enhance of the accuracy of the tone correction, the required tone number is set to 1024 as described above. However, usual printing can be sufficiently performed at 256 scale levels. In usual printing, therefore, the bit number of CMYK data output from the half-toning section 7 may be set in the following manner. In the case of 600 [dpi], for example, the bit number is about 256÷(4 ×4)=16 levels=4 bits, and, in the case of 300 [dpi], the bit number is about 256÷(2×2)=64 levels=6 bits.

Figure 4A:
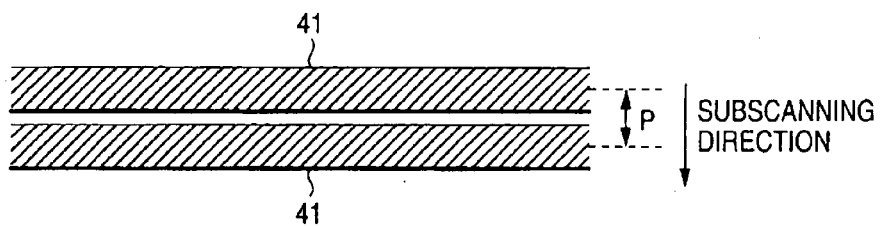
FIGS. 4A to 4C are views showing an example of half-tone dots on a stripe screen.
Figure 4B:
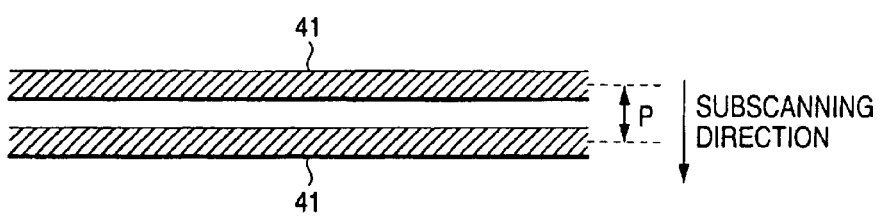
Figure 4C:
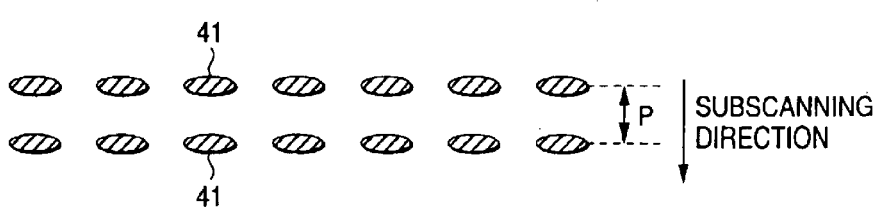

The half-toning section 7 may use a screen having a half-tone dot growing pattern such as shown in FIGS. 3A to 3C, in both printing of a patch image and usual printing. In the embodiment, however, such a screen is not used. Namely, when a patch image is to be printed, a special screen which is formed so as to enhance the detection accuracy of the screen gamma characteristics is used. An example of such a special screen is a stripe screen such as shown in FIGS. 4A to 4C in which half-tone dots 41 in the form of line segments are arranged in the subscanning direction (sheet feeding direction). Such a screen is hardly affected by mechanical feeding variations in the image forming process, and hence the detection accuracy of the screen gamma characteristics is excellent.

The CMYK data of pixels which are obtained as a result of the half-toning are supplied to the PWM section 9. As described above, the CMYK data which are supplied to the PWM section 9 and have undergone the half-toning indicate the sizes of the toners of the CMYK colors which are to be attached to pixels. By using the half-tone CMYK data, the PWM section 9 pulse-width-modulates exposing laser pulses of the CMYK colors in the print engine 11. As a result, in the print engine 11, images of four colors or CMYK which are respectively expressed by sets of half-tone dots are formed. The images of four colors are transferred in the form of a color image onto a sheet with being superimposed one another.

As seen from the above description, the print modes of the image forming apparatus 1 include the usual print mode and the patch image print mode (test print mode). In the usual print mode, in the case where the image forming apparatus 1 is a terminal printer of a computer system, the apparatus receives image information from the host computer and then prints the image, and, in the case where the apparatus is a copier, the apparatus reads an original which is set by the user and then prints the image. By contrast, in the test print mode, the image forming apparatus 1 prints a patch image which is previously prepared in order to measure the screen gamma characteristics 23 shown in quadrant C of FIG. 2. The data of the patch image are programmed in a ROM or the like of the image forming apparatus 1 (alternatively, in the case of a terminal printer, data of the patch image may be sent from the host computer, or, in the case of a copier, the user may set an original bearing the patch image).

The patch image is a color image which uses all kinds of toners of CMYK, and contains many different tone levels ranging from the minimum value to the maximum one for each of CMYK, and in which relationships among the tone levels of CMYK and places in the image are predetermined. An image containing all of 1024 tone levels for each of CMYK, such as that which uses all of dot patterns of 1024 tone levels that can be output from the half-toning section 7 may be used as the patch image. In the embodiment, however, a patch image is used in which the tones are roughened to one fourth of 1024 tone levels, namely, 256 tone levels. Specifically, the patch image used in the embodiment contains, for each of CMYK, 256 tone levels from the tone value of 0 corresponding to the minimum density to the tone value of 255 corresponding to the maximum density.

In the test print mode, the patch sensor 13 and the correction table calculation section 15 shown in FIG. 1 operate. The patch sensor 13 is an optical sensor which is incorporated into the print engine 11, and optically reads a patch image which is formed as a toner-developed image on a sheet or a transfer medium by the print engine 11. Alternatively, the patch sensor 13 is a potential sensor which is incorporated into the print engine 11, and electrically reads a patch image which is formed as an electrostatic latent image on a photosensitive member by the print engine 11. In the case where a patch image is actually printed onto a sheet, an output signal of the patch sensor 13 indicates values which respectively reflect OD values in various places (having various different tone levels) of the printed patch image. The output signal is supplied to the correction table calculation section 15.

On the basis of the output signal of the patch sensor 13, the correction table calculation section 15 first estimates by calculation the OD value of a printed image for each of CMYK. The printed image is obtained in the case where an image having the same tone levels as various ones of the patch image is printed in the usual print mode. This estimation of the OD value with respect to various tone levels is exactly identical with that of the screen gamma characteristics 23 shown in quadrant C of FIG. 2. Next, by using the estimated screen gamma characteristics 23, the correction table calculation section 15 calculates the tone correction table 17 such as shown in quadrant B of FIG. 2. The previous tone correction table 17 which has been registered in the nonvolatile memory of the image forming apparatus 1 is cleared away, and the calculated tone correction table 17 is newly registered in the nonvolatile memory.

Figure 5:
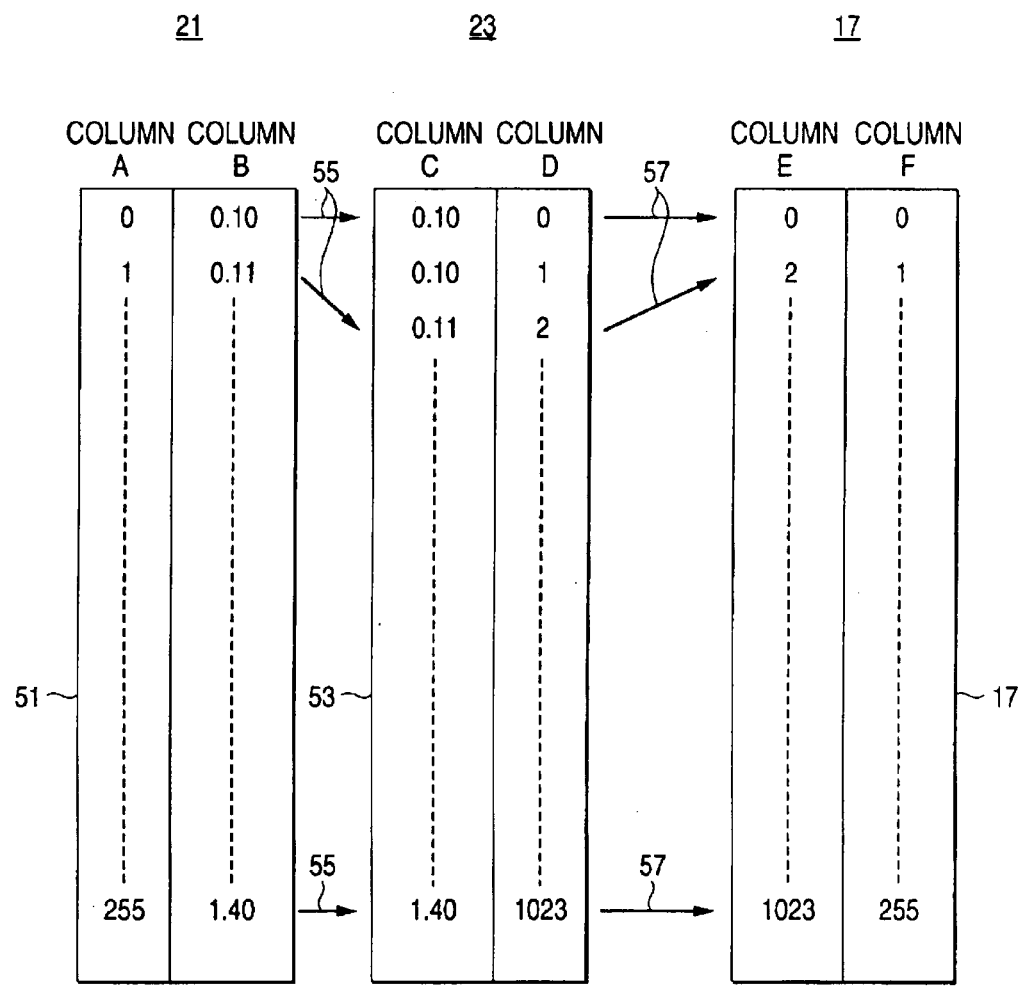
FIG. 5 is a diagram illustrating a method of preparing a tone correction table.

FIG. 5 shows a specific example of the method of calculating the tone correction table 17.

A table 51 which shows the ideal gamma characteristics 21 (quadrant A of FIG. 2) is previously programmed in a ROM or the like, for each of CMYK. As described above, the correction table calculation section 15 estimates the screen gamma characteristics 23 for each of CMYK on the basis of the signal from the patch sensor 13, and prepares a table 53 which indicates the characteristics, on a memory. (FIG. 5 shows portions corresponding to only one color in the tables 51 and 53.) As illustrated, in the ideal gamma characteristic table 51, output OD values (column B) are written with respect to an input tone level of 256 steps (8-bit word) (column A). By contrast, in the screen gamma characteristic table 53, output OD values (column D) are written with respect to an input tone level of 1024 steps (10-bit word) (column C). In the embodiment, as described above, the patch image contains a tone level of 256 steps in place of 1024 steps. Therefore, interpolation is performed on the value of the read signal of the 256 tone levels to estimate an OD value with respect to the 1024 tone levels, thereby preparing the screen gamma characteristic table 53 shown in FIG. 5. Next, the correction table calculation section 15 reads output OD values from column B of the ideal gamma characteristic table 51, and, as indicated by the arrows 55, finds output OD values which are respectively equal to the read output OD values from column C of the screen gamma characteristic table 53. Input tone levels (10-bit words) corresponding to the found output OD values are read from column D of the screen gamma characteristic table 53. As indicated by the arrows 57, the found output OD values are registered in column E (output tone levels) of the tone correction table 17. Gray scale levels of 256 steps (8-bit words) which are identical with those of column A of the ideal gamma characteristic table 51 are previously registered in column F (input tone levels) of the tone correction table 17. The tone levels which are read from the screen gamma characteristic table 53 are registered in column E in correspondence with all of the 256 tone levels 8-bit words) of column F, thereby completing the tone correction table 17. The newly completed tone correction table 17 is replaced with the existing tone correction table 17 in the nonvolatile memory.

In the tone correction table 17, the input tone levels have 8 bits and the output tone levels have 10 bits. By using the tone correction table 17, the tone correction section 5 of FIG. 1 converts the 8-bit tone level for each of CMYK supplied from the color conversion section 3, into a 10-bit tone level which is gray-scale corrected, and sends the tone-corrected bit tone level to the half-toning section 7. The corrected tone level which is sent from the tone correction section 5 to the half-toning section 7 is exactly identical with the corrected tone level l' which is given from quadrant B of FIG. 2 to quadrant C. The corrected tone level l' can express 1024 levels by using 10 bits. As seen from FIG. 2, this means that the screen gamma characteristics 23 can be accurately corrected. Therefore, the ideal gamma characteristics 21 can be accurately realized.

Figure 6:
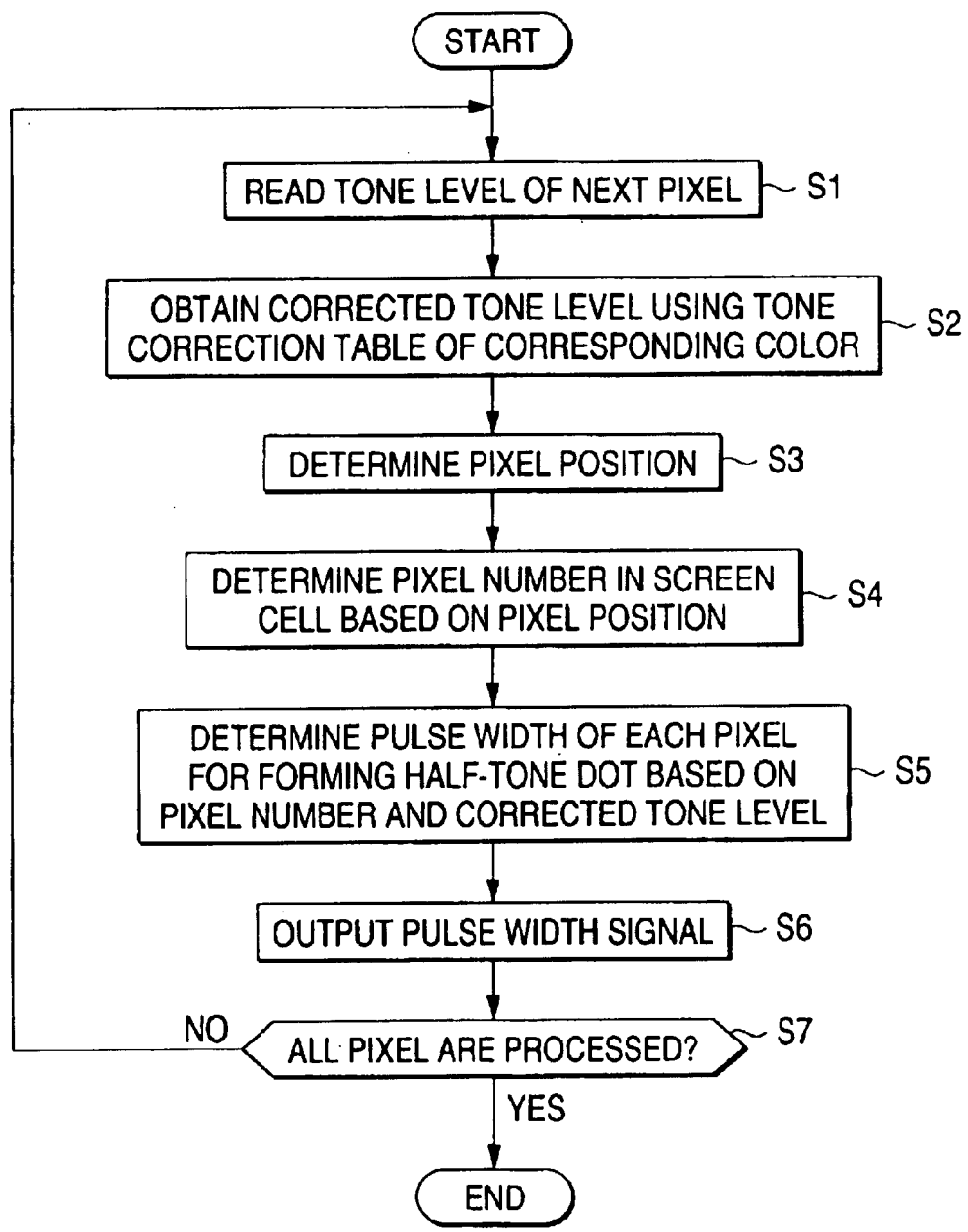
FIG. 6 is a flowchart of tone correction and half-toning.

FIG. 6 shows the flow of the operation of the tone correction section 5 and the half-toning section 7.

The tone correction section 5 receives an 8-bit tone level of each of CMYK of each pixel, from the color conversion section 3 (step S1). The received tone level is converted into a tone-corrected 10-bit tone level in accordance with the tone correction table 17 which corresponds to the respective color plane of CMYK (S2).

Figure 7:
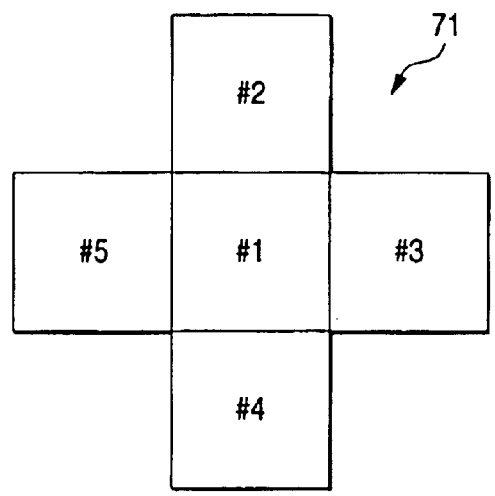
FIG. 7 is a diagram showing an example of a simple screen cell.

Next, the half-toning section 7 receives the tone-corrected 10-bit tone level of each pixel for each of CMYK, and first determines the position of each pixel in the image (S3). The half-toning section 7 thereafter determines the pixel number in a screen cell, from the pixel position in the image (S4). A screen cell is a section of plural pixel regions in which a single half-tone dot is to be grown. FIG. 7 shows the simplest example of a screen cell. The screen cell 71 consists of five pixels which are arranged in a cross shape. Pixel numbers #1 to #5 are allocated to the pixels. In a process of half-toning, such screen cells are virtually arranged in the form of tiles on the image, and, for the region of each of the screen cells, a dot corresponding to the tone level of the region is formed. In step S4 described above, this process is performed, that is, it is determined to which pixel in the screen cells, which are arranged as tiles on the image, each pixel of the image corresponds, or the pixel number is determined.

Figure 8:
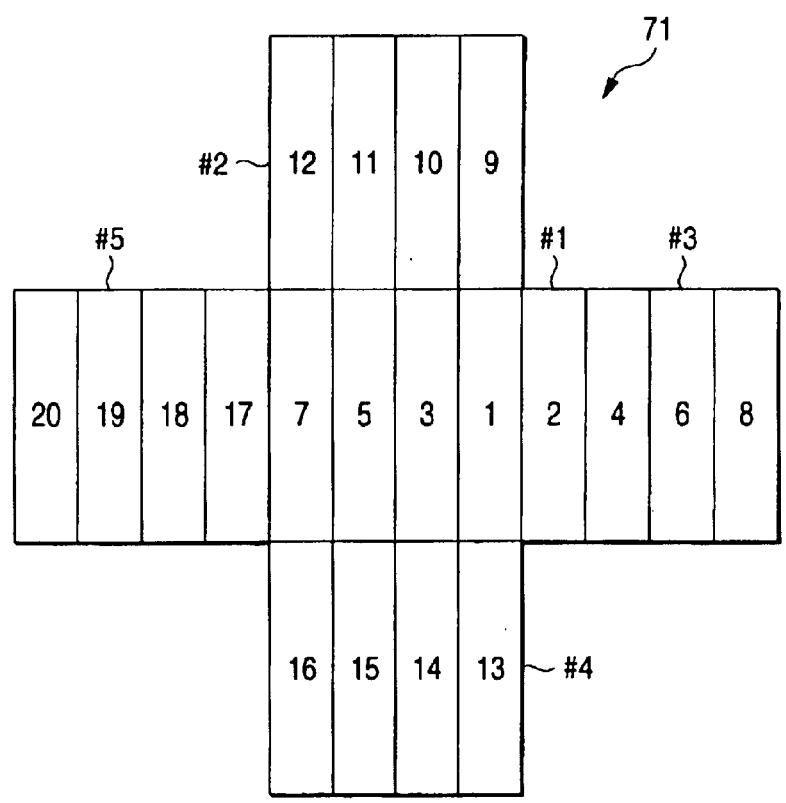
FIG. 8 is a diagram showing an example of the sequence of growing a half-tone dot in the screen cell of FIG. 7.

For each color of CMYK, thereafter, the half-toning section 7 determines the pulse width of a laser beam for a dot which is to be attached to each pixel so as to form a half-tone dot corresponding to the tone level, from the pixel number of each pixel in the screen cell which is determined in step S4, and the corrected tone level of each pixel which is received from the tone correction section 5 (S5). It is assumed that, in the screen cell 71 shown in FIG. 7, a half-tone dot growing pattern such as shown in FIG. 8 is employed. Referring to FIG. 8, each of rectangular regions which are obtained by dividing one pixel into four regions constitutes the minimum section of the dot size (i.e., the dot size of one pixel can be changed in four steps). As the tone level (density) is higher, the dot is gradually enlarged (the half-tone dot is grown) in the sequence of the illustrated numbers of 1 to 20. In this example, in a low-density region, the dot is grown only in pixels #1 and #3, and, in an intermediate density, the dot is expanded into pixel #2. When the density is made higher, the dot is expanded into pixel #4 and then into pixel #5. In this way, the size of the dot constituting the half-tone dot, and the place of the dot in the pixel vary depending on the pixel number and the tone level. In step S5 described above, for each pixel, the pulse width of a laser beam for drawing a dot corresponding to the pixel number and the tone level is determined.

The tone correction section 5 supplies a signal indicative of the thus-determined laser pulse width for each pixel for each color plane of CMYK, to the PWM section 9 (S6). The above-described steps are performed on all pixels in the image (S7).

As described above, the half-toning section 7 in the embodiment uses the different screens in the usual print mode and the test print mode. In the usual print mode, for example, a screen having a screen cell such as shown in FIG. 7 is used, and the dot size of one pixel is expressed by 6 bits so as to be variable in about 50 steps, thereby enabling 256 tone levels to be reproduced. By contrast, in the test print mode, for example, a stripe screen in which fine lines are arranged in the subscanning direction and in which one screen cell is configured by four pixels is used in order to enhance the detection accuracy of the gamma characteristics, and the dot size of one pixel is expressed by 8 bits so as to be variable in 256 steps, thereby enabling 1024 tone levels to be reproduced. In this way, the usual print mode and the test print mode use different screens, and hence the above-described processes of steps S4 and S5 of FIG. 6 have different contents in accordance with the respective screens.

In the above, an embodiment of the present invention has been described. The embodiment is used as an example for description of the present invention. It should be understood that the present invention is not restricted to the embodiment. Therefore, the present invention can be implemented also in various manners other than the embodiment.

What is claimed is:

1. An image forming apparatus for forming an image based on half-tone data with a coloring agent, comprising:
    a tone correction section for receiving input tone level data based on a color system of the coloring agent, and for applying a tone correction for compensating gamma characteristic variation of the image forming device with respect to the input tone level data to generate output tone level data; and
    a half-toning section for applying a half-toning with respect to the output tone level data to generate the half-tone data,
    wherein the tone correction is based on gamma characteristics, of the image forming apparatus, having a value resolution higher that a value resolution of the input tone level data.

2. The image forming apparatus as set forth in claim 1, wherein the number of tone levels contained by the output tone level data is greater than that of the input tone level data.

3. The image forming apparatus as set forth in claim 1, further comprising:
    a correction information generating section for measuring an optical density of a test image printed in a test printing operation to obtain the gamma characteristics of the image forming apparatus.

4. The image forming apparatus as set forth in claim 3, wherein the correction information generating section generates the tone correction information from the optical density of the test image by calculation.

5. The image forming apparatus as set forth in claim 3, wherein the half-tone data is generated such that a bit number thereof assigned to one pixel of one color in the test printing operation is greater than that in a usual printing operation for printing an image to be appreciated.

6. The image forming apparatus as set forth in claim 3, wherein the half-toning section applies the half-toning with a screen method using different screens in the test printing operation and in a usual printing operation for printing an image to be appreciated, and
    wherein the screen frequency of the screen used in the test printing operation is greater than that used in the usual printing operation.

7. The image forming apparatus as set forth in claim 1, wherein the input tone level data and output tone level data are CMYK data.

8. The image forming apparatus as set forth in claim 1, wherein the gamma characteristic variation results from ambient atmospheric conditions or aging.

9. The image forming apparatus as set forth in claim 1, wherein the tone correction for compensating gamma characteristic variation of the image forming device is determined by comparing actual gamma characteristics of the image forming device with ideal gamma characteristics of the image forming device and performing a determination calculation.

10. The image forming apparatus as set forth in claim 3, wherein the test image is comprised of all kinds of toners of CMYK and contains many different tone levels.

11. The image forming apparatus as set forth in claim 1, wherein the value resolution of the gamma characteristics is greater than a value resolution of the half-tone data.

12. An image forming method applied to an image forming apparatus for forming an image based on half-tone data with a coloring agent, comprising steps of:
    obtaining input tone level data based on a color system of the coloring agent;
    applying a tone correction for compensating gamma characteristic variation of the image forming device with respect to the input tone level data to generate output tone level data;
    applying a half-toning with respect to the output tone level data to generate the half-tone data,
    wherein the tone correction is based on gamma characteristics, of the image forming apparatus, having a value resolution higher that a value resolution of the input tone level data.

13. The image forming method as set forth in claim 12, wherein the tone correction is applied such that the number of tone levels contained by the output tone level data is greater than that of the input tone level data.

14. The image forming method as set forth in claim 12, further comprising a step of:

measuring an optical density of a test image printed in a test printing operation to obtain the gamma characteristics of the image forming apparatus.

15. The image forming method as set forth in claim 14, wherein the tone correction information is generated from the optical density of the test image by calculation.

16. The image forming method as set forth in claim 14, wherein the half-tone data is generated such that a bit number thereof assigned to one pixel of one color in the test printing operation is greater than that in a usual printing operation for printing an image to be appreciated.

17. The image forming method as set forth in claim 14, wherein the half-toning is applied with a screen method using different screens in the test printing operation and in a usual printing operation for printing an image to be appreciated, and wherein the screen frequency of the screen used in the test printing operation is greater than that used in the usual printing operation.

18. The image forming method as set forth in claim 12, wherein the input tone level data and output tone level data are CMYK data.

19. The image forming method as set forth in claim 12, wherein the gamma characteristic variation results from ambient atmospheric conditions or aging.

20. The image forming method as set forth in claim 12, wherein the tone correction for compensating gamma characteristic variation of the image forming device is determined by comparing actual gamma characteristics of the image forming device with ideal gamma characteristics of the image forming device and performing a determination calculation.

21. The image forming method as set forth in claim 14, wherein the test image is comprised of all kinds of toners of CMYK and contains many different tone levels.

22. The image forming method as set forth in claim 12, wherein the value resolution of the gamma characteristics is greater than a value resolution of the half-tone data.

23. A computer-readable recording medium for recording a program causing a computer to execute an image forming method applied to an image forming apparatus for forming an image based on half-tone data with a coloring agent, comprising steps of:

obtaining input tone level data based on a color system of the coloring agent;

applying a tone correction for compensating gamma characteristic variation of the image forming device with respect to the input tone level data to generate output tone level data;

applying a half-toning with respect to the output tone level data to generate the half-tone data, wherein the tone correction is based on gamma characteristics, of the image forming apparatus, having a value resolution higher that a value resolution of the input tone level data.

24. The computer-readable recording medium as set forth in claim 23, wherein the tone correction is applied such that the number of tone levels contained by the output tone level data is greater than that of the input tone level data.

25. The computer-readable recording medium as set forth in claim 24, the image forming method executed by the program further comprising a step of:

measuring an optical density of a test image printed in a test printing operation to obtain the gamma characteristics of the image forming apparatus.

26. The image forming method as set forth in claim 25, wherein the tone correction information is generated from the optical density of the test image by calculation.

27. The computer-readable recording medium as set forth in claim 23, wherein the input tone level data and output tone level data are CMYK data.

28. The computer-readable recording medium as set forth in claim 23, wherein the gamma characteristic variation results from ambient atmospheric conditions or aging.

29. The computer-readable recording medium as set forth in claim 23, wherein the tone correction for compensating gamma characteristic variation of the image forming device is determined by comparing actual gamma characteristics of the image forming device with ideal gamma characteristics of the image forming device and performing a determination calculation.

30. The computer-readable recording medium as set forth in claim 25, wherein the test image is comprised of all kinds of toners of CMYK and contains many different tone levels.

31. The computer-readable recording medium as set forth in claim 23, wherein the value resolution of the gamma characteristics is greater than a value resolution of the half-tone data.

32. An image forming apparatus for forming an image based on half-tone data with a coloring agent, comprising:

a tone correction section for receiving input tone level data with regard to a color system of the coloring agent, and for applying a tone correction for compensating gamma characteristic variation of the image forming device with respect to the input tone level data to generate output tone level data corrected by the tone correction; and a half-toning section for applying a half-toning with respect to the output tone level data to generate the half-tone data, wherein the number of tone levels contained by the output tone level data is greater than that of the input tone level data.

33. An image forming apparatus for forming an image based on half-tone data with a coloring agent, comprising:

a tone correction section for receiving input tone level data with regard to a color system of the coloring agent, and for applying a tone correction for compensating gamma characteristic variation of the image forming device with respect to the input tone level data to generate output tone level data corrected by the tone correction;

a half-toning section for applying a half-toning with respect to the output tone level data to generate the half-tone data; and a correction information generating section for measuring an optical density of a test image printed in a test printing operation to obtain the gamma characteristics of the image forming apparatus, and for generating tone correction information to be utilized by the tone correction section, wherein the half-tone data is generated such that a bit number thereof assigned to one pixel of one color in the test printing operation is greater than that in a usual printing operation for printing an image to be appreciated.

34. An image forming apparatus for forming an image based on half-tone data with a coloring agent, comprising:

a tone correction section for receiving input tone level data with regard to a color system of the coloring agent, and for applying a tone correction for compensating gamma characteristic variation of the image forming device with respect to the input tone level data to generate output tone level data corrected by the tone correction;

a half-toning section for applying a half-toning with respect to the output tone level data to generate the half-tone data; and a correction information generating section for measuring an optical density of a test image printed in a test printing operation to obtain the gamma characteristics of the image forming apparatus, and for generating tone correction information to be utilized by the tone correction section, wherein:

the half-toning section applies the half-toning with a screen method using different screens in the test printing operation and in a usual printing operation for printing an image to be appreciated, and the screen frequency of the screen used in the test printing operation is greater than that used in the usual printing operation.

35. An image forming method applied to an image forming apparatus for forming an image based on half-tone data with a coloring agent, comprising the steps of:

obtaining input tone level data with regard to color system of the coloring agent;

applying a tone correction for compensating gamma characteristic variation of the image forming device with respect to the input tone level data to generate output tone level data; and applying a half-toning with respect to the output tone level data to generate the half-tone data, wherein the tone correction is applied such that the number of tone levels contained by the output tone level data is greater than that of the input tone level data.

36. An image forming method applied to an image forming apparatus for forming an image based on half-tone data with a coloring agent, comprising the steps of:

obtaining input tone level data with regard to color system of the coloring agent;

applying a tone correction for compensating gamma characteristic variation of the image forming device with respect to the input tone level data to generate output tone level data;

applying a half-toning with respect to the output tone level data to generate the half-tone data measuring an optical density of a test image printed in a test printing operation to obtain the gamma characteristics of the image forming apparatus; and generating tone correction information to be utilized in the step of applying the tone correction.

wherein the half-tone data is generated such that a bit number thereof assigned to one pixel of one color in the test printing operation is greater than that in a usual printing operation for printing an image to be appreciated.

37. An image forming method applied to an image forming apparatus for forming an image based on half-tone data with a coloring agent, comprising the steps of:

obtaining input tone level data with regard to color system of the coloring agent;

applying a tone correction for compensating gamma characteristic variation of the image forming device with respect to the input tone level data to generate output tone level data;

applying a half-toning with respect to the output tone level data to generate the half-tone data.

measuring an optical density of a test image printed in a test printing operation to obtain the gamma characteristics of the image forming apparatus; and generating tone correction information to be utilized in the step of applying the tone correction, wherein:

the half-toning is applied with a screen method using different screens in the test printing operation and in a usual printing operation for printing an image to be appreciated, and the screen frequency of the screen used in the test printing operation is greater than that used in the usual printing operation.

38. A computer-readable recording medium for recording a program causing a computer to execute an image forming method applied to an image forming apparatus for forming an image based on half-tone data with a coloring agent, comprising the steps of:

obtaining input tone level data with regard to color system of the coloring agent;

applying a tone correction for compensating gamma characteristic variation of the image forming device with respect to the input tone level data to generate output tone level data;

applying a half-toning with respect to the output tone level data to generate the half-tone data, wherein the tone correction is applied such that the number of tone levels contained by the output tone level data is greater than that of the input tone level data.

39. The computer-readable recording medium as set forth in claim 38, the image forming method executed by the program further comprising the steps of:

measuring an optical density of a test image printed in a test printing operation to obtain the gamma characteristics of the image forming apparatus, and generating tone correction information to be utilized in the step of applying the tone correction.

40. The image forming method as set forth in claim 39, wherein the tone correction information is generated from the optical density of the test image by calculation.

41. An image forming apparatus for forming an image based on half-tone data with a coloring agent, comprising:

a correction information generating section for generating tone correction information for compensating gamma characteristic variation of the image forming device, the tone correction information having a first value resolution;

a tone correction section for receiving input tone level data based on a color system of the coloring agent and having a second value resolution, and for applying the tone correction information with respect to the input tone level data, wherein the first value resolution is higher than the second value resolution.

42. An image forming method applied to an image forming apparatus for forming an image based on half-tone data with a coloring agent, comprising steps of:

receiving input tone level data based on a color system of the coloring agent and having a first value resolution;

generating tone correction information for compensating gamma characteristic variation of the image forming device, the tone correction information having a second value resolution higher than the first value resolution; and applying the tone correction information with respect to the input tone level data.

43. A computer-readable recording medium for recording a program causing a computer to execute an image forming method applied to an image forming apparatus for forming an image based on half-tone data with a coloring agent, comprising steps of:

receiving input tone level data based on a color system of the coloring agent and having a first value resolution;

generating tone correction information for compensating gamma characteristic variation of the image forming device, the tone correction information having a second value resolution higher than the first value resolution; and applying the tone correction information with respect to the input tone level data.

* * * * *